Figure 1:
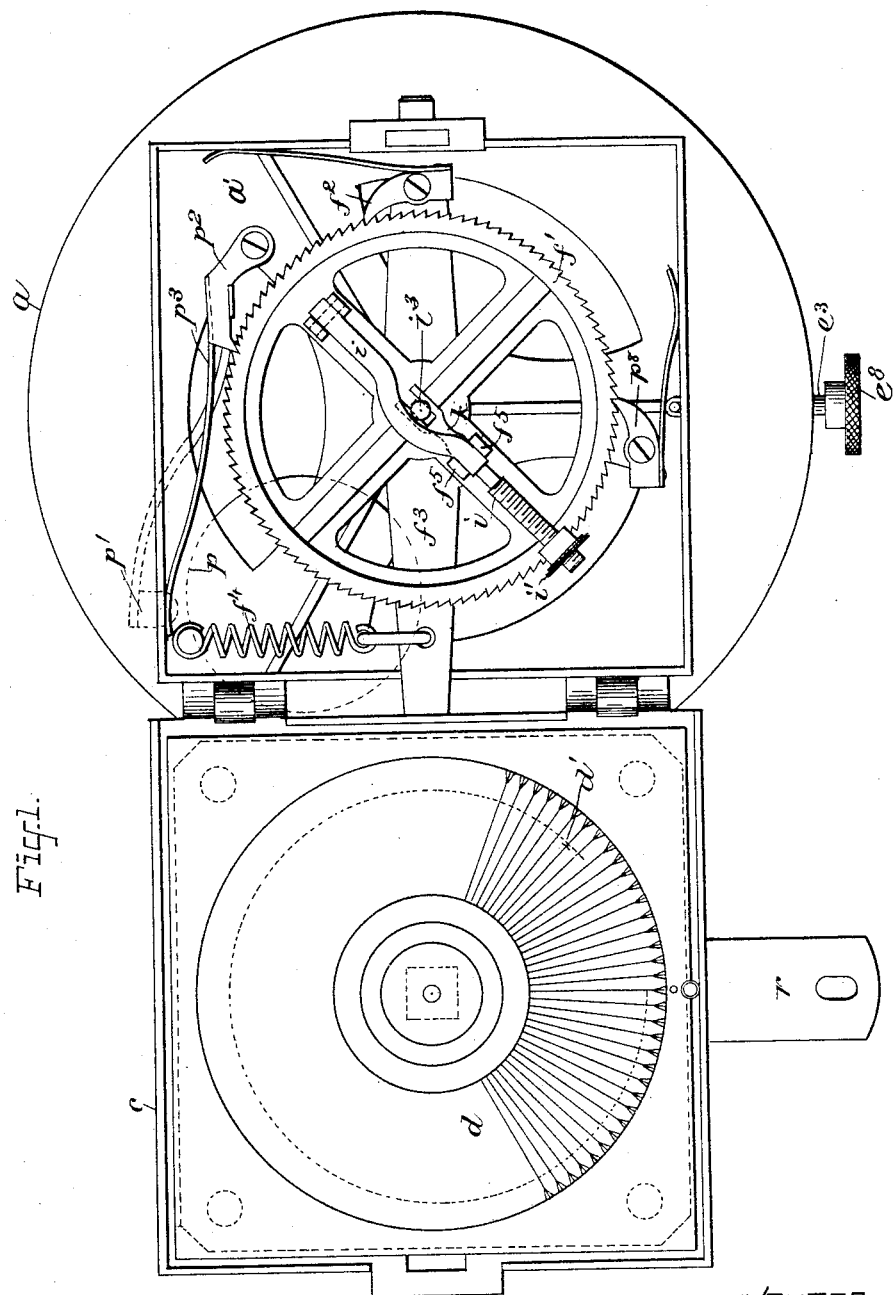

(No Model.) 5 Sheets—Sheet 1.

C. CROOK.
FARE REGISTER AND RECORDER.

No. 483,102. Patented Sept. 20, 1892.

ATTEST:

INVENTOR:
Charles Crook
By Chas. F. Dane
Attorney (No Model.) 5 Sheets—Sheet 2.

C. CROOK.
FARE REGISTER AND RECORDER.

No. 483,102. Patented Sept. 20, 1892.

ATTEST:
Wm Dane
Annie L. Hayes.

INVENTOR:
Charlie Crook
By Chas. F. Dane
Attorney (No Model.) 5 Sheets—Sheet 3.
C. CROOK.
FARE REGISTER AND RECORDER.
No. 483,102. Patented Sept. 20, 1892.
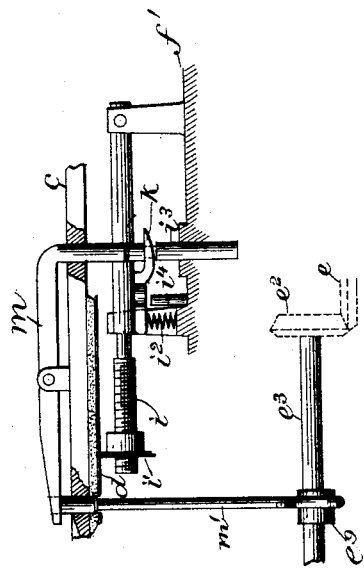
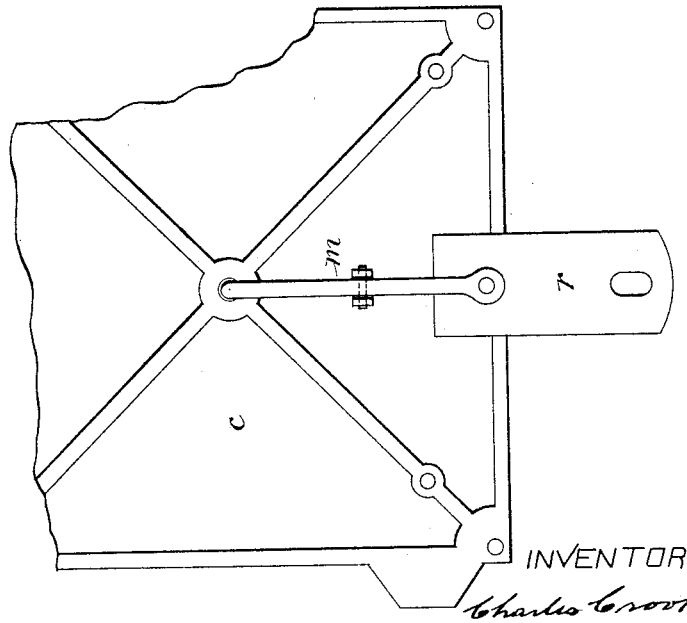

(No Model.) 5 Sheets—Sheet 4.

C. CROOK.
FARE REGISTER AND RECORDER.

No. 483,102. Patented Sept. 20, 1892.

Witnesses:—
D. H. Hayward
J. W. Dane Jr.

Inventor:—
Charles Crook
by Chas. F. Dane
his atty.

(No Model.) 5 Sheets—Sheet 5.

C. CROOK.
FARE REGISTER AND RECORDER.

No. 483,102. Patented Sept. 20, 1892.

Attest:
Geo. H. Potts.
A. L. Hayes.

Inventor:
Charles Crook.
by Chas. F. Dane
his atty.

UNITED STATES PATENT OFFICE.

CHARLES CROOK, OF BROOKLYN, ASSIGNOR TO ELI BALDWIN, OF NEW YORK, N. Y.

FARE REGISTER AND RECORDER.

SPECIFICATION forming part of Letters Patent No. 483,102, dated September 20, 1892.

Application filed November 30, 1891. Serial No. 413,483. (No model.)

*To all whom it may concern:*

Be it known that I, CHARLES CROOK, a citizen of the United States, residing in the city of Brooklyn, county of Kings, and State of New York, have invented certain new and useful Improvements in Fare Registers and Recorders, of which the following description, taken in connection with the drawings herewith accompanying, is a specification.

My invention relates to that class of fare registers and recorders provided with a temporary or trip register consisting of the dial-plate and index-hand or pointer adapted to indicate the number of fares for a single trip, a total or permanent register for registering the total number of fares collected during the day or longer period of time and exposing the same to view through a suitable opening or openings in the dial-plate, a recorder for making a permanent record of the total number of fares collected during the day or longer period of time, consisting of a paper dial and mechanism for puncturing or marking the same to indicate the fares, which said dial is located within the outer casing of the register, and a trip-indicator for indicating the direction of travel of the car.

My present invention consists more particularly, first, in the mechanism for resetting the index-hand or pointer to zero at the end of a trip and the means for locking said resetting mechanism when the index-hand has been carried to the zero-point; secondly, in the means for making a permanent record or indication of each trip upon the inner dial simultaneously with the resetting of the index-hand and at the same operation; thirdly, in the means for operating or resetting the trip-indicator; fourthly, in the combination of parts whereby the index-hand is reset to zero at the end of each trip, a record made of each trip at the end of the same upon the inner dial, and the trip-indicator reset simultaneously and at one operation, and, fifthly, in other details of construction and combinations of parts, as will hereinafter be set forth in detail, and pointed out in the claims.

The object of my invention is to provide a fare register and recorder embodying the features above referred to in a simplified form, and in combination, whereby the several parts may be operated simultaneously at one operation.

Figure 2:
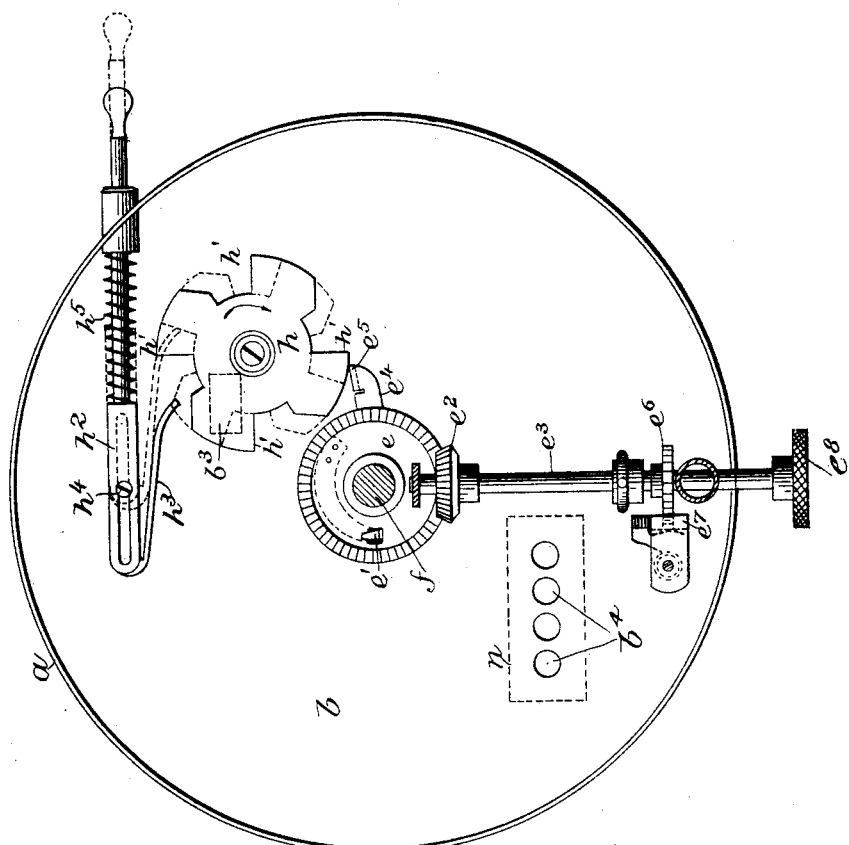
Figure 3:
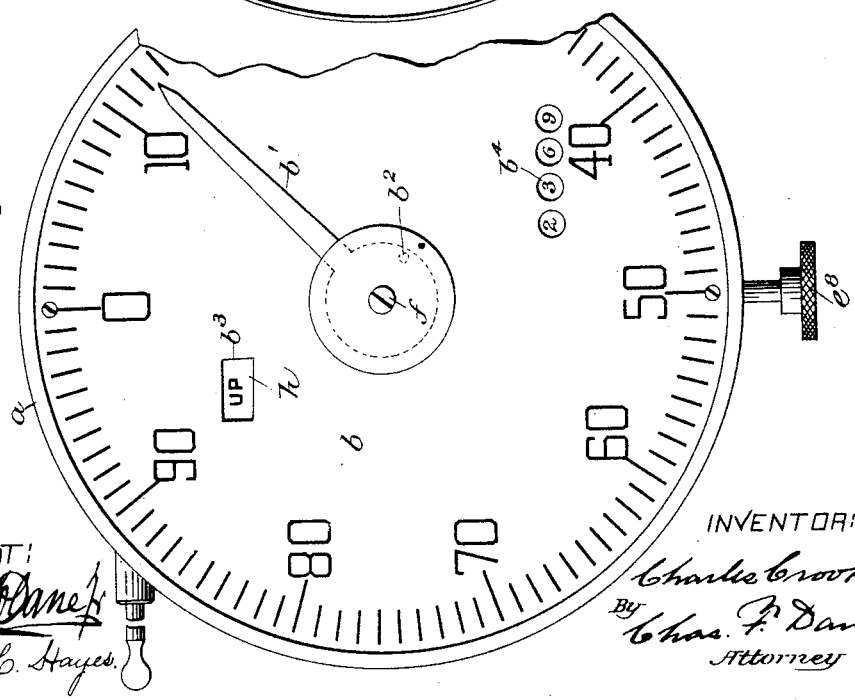
Figure 6:
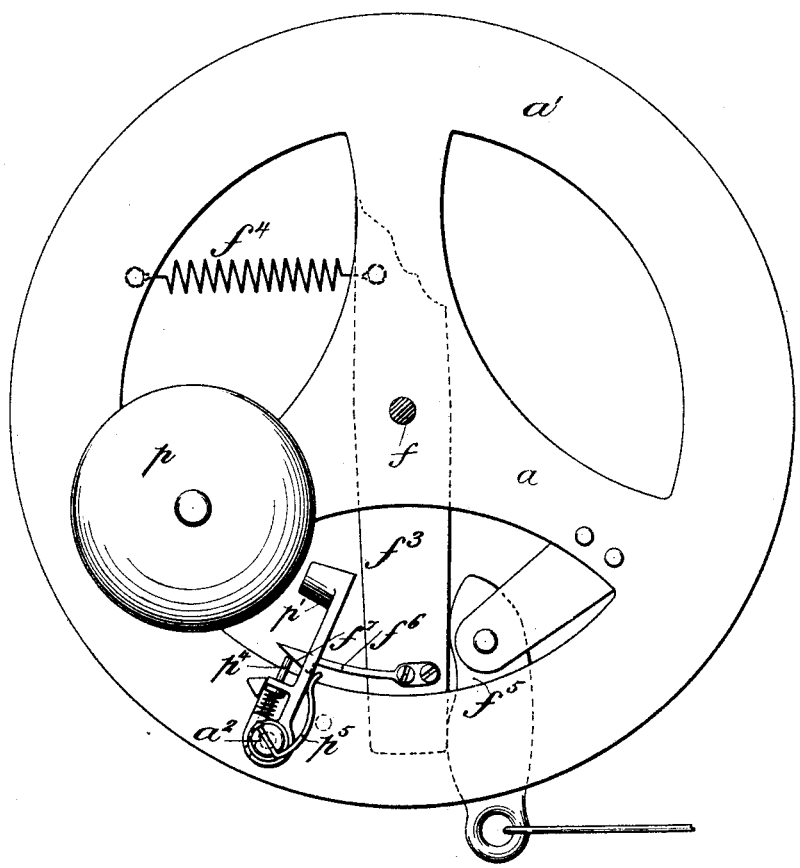
Figure 7:
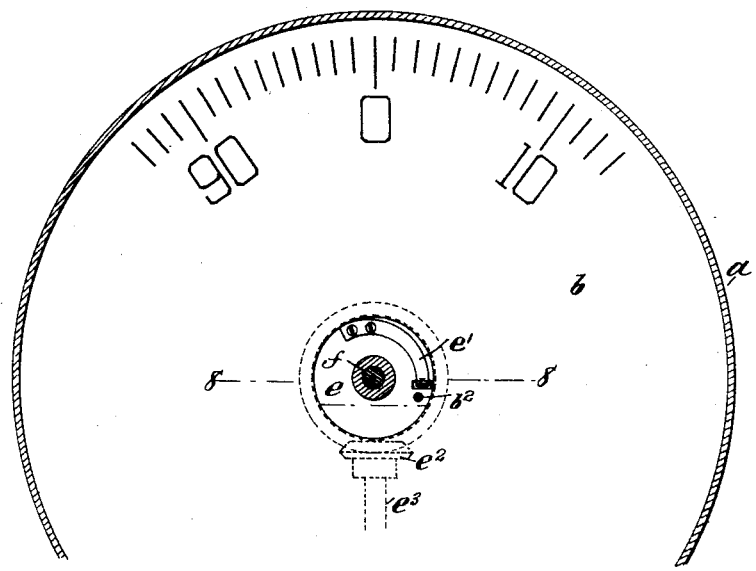
Figure 8:
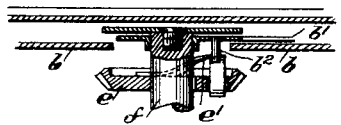

Referring to the drawings, Figure 1 represents a view of the register with the hinged back or cover opened, exposing to view the interior operating mechanism and the graduated paper dial located on said hinged cover, upon which the fares and trips are permanently recorded. Fig. 2 represents a view of the under side of the face or dial plate, showing the trip or direction indicator plate and its operating mechanism; and Fig. 3 represents a top or face view of the same. Fig. 4 represents an exterior view of the hinged back or cover, showing a lever supported thereon, to be hereinafter referred to. Fig. 5 represents a vertical sectional view taken through a portion of the register, showing a section of the inner dial and its marking mechanism; and Fig. 6 represents a detail view of the alarm or bell operating mechanism in a modified form. Fig. 7 represents a top plan view of a portion of the instrument with the index-hand and the upper end of the rotating shaft $f$ cut away, showing a top view of the gear $e$ and the spring-catch thereon for engaging with and operating the index-hand or pointer. Fig. 8 represents a vertical sectional view through line 8 8 of Fig. 7, showing the connection between the index-hand and its resetting mechanism.

To explain in detail, $a$ represents the outer casing of the instrument, $b$ the face or visible dial plate, and $c$ the back of the case. The latter is hinged, as shown, in order that the same may be opened to enable the interior mechanism to be easily reached for repairs or other purpose, and it also forms the support upon which the graduated paper dials, (represented at $d$ in Fig. 1,) on which a permanent record of the fares, trips, &c., is made by means and in a manner as will hereinafter be described, are detachably secured.

The index-hand or pointer $b'$ is operated—that is, moved over the face of the dial $b$—to indicate the number of fares or passengers rung up by means of a centrally-located rotating shaft $f$, on which it is supported, said shaft being mounted in suitable bearings, in which it is free to rotate, and is provided with a ratchet-wheel $f'$, secured thereto, which is operated to rotate said shaft and give the index-hand carried thereby its step-by-step movement by means of a pawl $f^2$, carried by the operating-lever $f^3$, which projects through the casing $a$ and is adapted to be operated to cause the pawl to move said ratchet-wheel $f'$ by means of the usual ringing or operating device connected therewith, which is operated by the conductor upon receipt of a fare. The lever $f^3$ is automatically drawn back to its normal position to move its pawl into engagement with the next-preceding tooth in the wheel $f'$, after being pulled by the operator, by means of a spring $f^4$, as shown in Fig. 1. The above-described mechanism for operating the index-hand to give the same its forward step-by-step movement to indicate the fares rung up is not of my present invention, and therefore any detailed description or illustration of the same would seem unnecessary.

In order to reset the index-hand $b'$ to zero at the end of a trip or other desired time, I have provided said index-hand adjacent to its point of connection with its supporting-shaft $f$ with a projection (shown at $b^2$ in Figs. 3 and 8) on its under side, which extends below the dial $b$ through an opening therein in a position to be engaged by a spring-catch $e'$, secured on a disk or gear $e$, (see Figs. 2 and 8,) loosely supported on the said shaft $f$ beneath the dial-plate. Said gear $e$ is adapted to be operated or rotated to cause its catch $e'$ to engage the said projection on the under side of the index-hand and carry or reset the latter to zero by means of an engaging-gear $e^2$, located on the end of an operating-rod $e^3$, which is supported in position in suitable bearings and at its free end projects through the outer casing and is provided with a suitable knob or handle $e^8$, as shown in Figs. 1, 2, and 3, as a means by which it may be operated.

The gear $e$ is provided with an arm $e^4$, projecting therefrom beyond its periphery, which is provided with a lip or projection $e^5$, adapted to engage the outer periphery of the direction-indicator plate $h$, as shown in Fig. 2, when the index-hand has been reset to zero to lock said gear from further forward movement, as will be readily understood. The gear $e$ has a movement in a forward or one direction only by means of a ratchet wheel or disk $e^6$, secured on its operating-shaft $e^3$, which is engaged by the free end of a spring plate or catch $e^7$, secured on the under side of the dial-plate $b$ in a manner to allow movement in one direction only, as well understood by those skilled in the art.

The spring-catch $e'$, located on the gear $e$, consists of a flat spring secured at one end on the disk $e$ with its free end slightly raised above the surface of the latter in such manner as to form a catch to engage the projection on the index-hand when the disk $e$ is operated to return the index-hand to zero and be vertically yielding to allow the said projection to pass over the same when moving in a direction from its rear end and the index-hand is being moved forward, as will be readily understood.

The direction-indicator $h$, or that plate provided with the proper words or characters to denote the direction of travel of the car, is pivotally secured to the rear side of the dial-plate, as shown in Fig. 2, adjacent to an opening $b^3$ therein, and is adapted to be rotated in a manner, as will be described, to bring the proper word, located on its upper side, in position before the said opening $b^3$ to be visible from the face of the register. The outer periphery of this plate $h$ is cut away at four points, forming four projections, (represented at $h'$,) as a means by which the same may be engaged and operated, as will be described.

After the index-hand $b'$ has been reset the arm $e^4$ and the direction-indicator $h$ are in a position as shown in Fig. 2, said arm being in engagement with said indicator-plate and accordingly locked from movement, and when it is desired to reset the index-hand and direction-indicator at the end of a trip the indicator $h$ must first be moved or rotated slightly by means of a device $h^2$ to a position, as shown by dotted lines in said Fig. 2, to move the peripheral section with which the end of the arm $e^4$ engages beyond the latter to allow the same and its supporting disk or gear $e$ to be rotated to reset the index-hand, and as the said arm $e^4$ is thus moved it engages the adjacent projection $h'$ of the indicator-plate and moves the latter a quarter-revolution, being a sufficient distance to bring the succeeding word, which indicates the direction of the next trip, to a position before the opening $b^3$ in the dial-plate, and also to bring the succeeding peripheral section of the indicator $h$ in a position to engage the arm $e^4$ after making a complete revolution and the index-hand $b'$ has reached the zero-point. The said device $h^2$, adapted for giving the direction-indicator its preliminary move to allow for the operation of the resetting mechanism, consists of a rod loosely supported in suitable bearings within the outer casing $a$, with one end projecting through the latter as a means for operating the same, and at its inner end provided with a spring arm or catch $h^3$, which is adapted to engage the side or inner edge of one of the sections $h'$ when the operating-rod is pulled outward and move the indicator a sufficient distance to allow for the operation of the resetting mechanism, as before described. It is obvious, however, that a spring-operated pawl might be secured on the end of said operating-rod, in lieu of the spring-arm $h^3$, for engaging with and operating the indicator-plate in the same manner as the said spring-arm without departing from the spirit of my invention. The device $h^2$ is limited in its movement by a screw or pin $h^4$, which projects through a longitudinal slot in the same, the movement being limited to the length of said slot. The rod is moved back to its normal position after being pulled out to move the direction-indicator by a coiled spring $h^5$.

The inner or concealed dial $d$, which is preferably formed of paper, is provided with radial lines to form spaces corresponding in number to the spaces on the face or visible dial $b$ and the number of teeth of the ratchet-wheel $f'$ in order that both dials may tally in the number of fares rung up for a trip, &c., as will appear obvious. This dial is detachably secured upon the inner side of the hinged back $c$ in a position to be operated upon by its marking device, as will be described, and also as a convenient position to be removed or inspected when the cover is opened.

The device for indicating or marking the number of fares, trips, &c., on the dial $d$ consists of an arm $i$, which is pivotally supported at one end between two lugs on the wheel $f'$, and at its free end is screw-threaded part way of its length, upon which is located a marking-wheel $i'$, which is provided with a double row of teeth on its outer periphery, one row projecting beyond the other, the function for both of which will be described. This marking-wheel is preferably formed by employing two toothed disks of different diameters and securing the same to a supporting wheel or roll, as shown. The marking device is elastically pressed against the dial $d$ by a spring $i^2$, (supported on the wheel $f'$,) acting against the under side of the arm $i$ with a pressure sufficient to cause the outer row of teeth to mark the dial $d$, but not sufficient to cause the inner or smaller row to mark the dial. Thus when the wheel $f'$ is rotated the arm $i$ is carried with the same, causing the outer row of teeth on the wheel $i'$ to mark or detent the dial, and as the wheel $i'$ is thus moved by contact with said dial it is caused to move inward or outward by reason of the screw-thread upon its supporting-arm, and thus produce a spiral line upon the dial $d$. The arm $i$ adjacent to its free end is supported and held from lateral movement in its relation to its supporting-wheel $f'$ by means of two lugs $f^5$ $f^5$, located on the latter at each side of said arm, as more clearly shown in Fig. 1. By this described means a permanent and accurate record is made on the dial $d$ of the fares rung up, and one that cannot be tampered with by reason of its location within the case, and as the wheel $f'$, which carries the marking device, is movable in one direction only and remains stationary while the index-hand is being reset. A lever (represented at $k$ in Figs. 1 and 5) is elastically held in engagement with the under side of the arm $i$ by means of the said spring $i^2$ engaging and supporting said lever near one end thereof, and at its opposite end the lever is bifurcated and embraces a pin $i^3$ between the shoulders formed thereon by a groove or depression therein, as clearly shown in said Figs. 1 and 5, in a manner to be movable therewith. The said pin $i^3$ is supported in an opening in the hub of the wheel $f'$. When the marking-wheel $i'$ is in contact with the dial $d$, the lever $k$ is held in close or actual contact with a pin $i^4$ on the wheel $f'$, on which it fulcrums when operated, in a manner as will be described. At the end of a trip, and when the index-hand $b'$ is being reset, the said rod or pin $i^3$ is pressed in by a lever $m$ to move the connecting end of the lever $k$ and cause its opposite end to act against the arm $i$ and press the wheel $i'$ against the dial $d$ with sufficient pressure to cause the inner row of teeth, as well as the outer row, to mark the same, and thus make a double mark or row of detents, as shown at $d'$ in Fig. 1, to indicate the end of the trip. This operation of the marking device is accomplished simultaneously with the resetting of the index-hand and the direction-indicator and at the same operation by means of the lever $m$, which is pivoted on the back or hinged cover $c$, and operated by a connecting rod or link $m'$, which latter at one end embraces a cam or eccentric $e^9$, located on the main operating-shaft $e^3$, as more clearly shown in Fig. 5, and is operated or caused to be raised and lowered thereby when the latter is revolved to reset the index-hand and direction-indicator, as before described. This vertical movement of the connecting-rod $m'$ serves to raise the connecting end of the lever $m$ and cause its opposite end to press in the pin $i^3$ and connecting end of the lever $k$ to cause the marking device to make the double mark or imprint on the paper dial to denote the end of the trip, as hereinbefore described.

Referring to Figure 1, I have shown one means for operating the alarm by the operating-lever $f^3$ when moved or operated to indicate a fare received, which consists in securing the arm of the bell-hammer $p'$ on a pawl $p^2$, pivoted on the supporting-frame $a'$, which pawl is elastically held in engagement with the toothed periphery of the wheel $f'$ by a spring $p^3$ in such manner that for each time the lever $f^3$ is operated and the wheel $f'$ moved the pawl $p^2$ is operated to cause the hammer $p'$ to strike the bell, (represented at $p$,) as will be readily understood. The said pawl $p^2$ and a second spring-actuated pawl (represented at $p^4$) act as retaining-pawls to engage the ratchet-wheel $f'$ and prevent backward movement of the same.

I have also shown another and modified means for operating the alarm, as illustrated in Fig. 6. In this instance I have employed a second lever $f^5$, which is adapted to be pivoted on the frame $a'$ or part thereof, with one end projecting through the outer casing of the instrument in a position to be engaged and operated, and at its inner cam-shaped end is adapted to engage the lever $f^3$ to operate the same for the purpose as hereinbefore set forth, the object of the employment of this second lever in combination with the lever $f^3$ being to lessen the force required to operate the latter, as will appear obvious. The bell-hammer in this instance is pivoted on a post or stud $a^2$, and is elastically held in close or actual contact with the bell by a spring $p^5$, acting against the same. This hammer is operated by the lever $f^3$ through the medium of an arm $f^6$, secured thereon, which is provided with a catch or projection $f^7$ at its free end, adapted to move past an elastically-extended pin $p^4$, supported by the bell-hammer, when the lever $f^3$ is moved forward to operate the index-pointer and indicate a fare, and on the return stroke of the latter the catch $f^7$ engages the pin $p^4$ and draws the bell-hammer backward for its rebound. By this means the alarm is sounded on the return stroke of the lever and after the index-hand has been moved, thus insuring the operation of the registering and recording devices before the bell or alarm is sounded. The pin $p^4$ is held in its elastically-extended position on the bell-hammer by means of a coiled spring located thereon, which exerts an outward pressure on the same, as clearly shown in Fig. 6.

In the drawings I have also illustrated a registering device $n$ of usual construction, which is adapted to be supported within the outer case $a$ adjacent to the dial $b$ and be visible through openings $b^4$ therein to indicate the total of the fares rung up, said device being operated simultaneously with the register and recorder hereinbefore described by a rod (not shown in the drawings) connecting the same with the operating-lever $f^3$. This registering device we employ merely for convenience in observing the total number of fares rung up at any desired time without opening the case for reference to the inner dial $d$; but such register is not of my present invention, and hence is not claimed herein.

The arm (represented at $r$ in Figs. 1 and 4) projecting from the side of the instrument is adapted for supporting or hanging the instrument in a car or other place.

I do not wish to confine myself to the particular form of construction and arrangement of the several parts forming the instrument as described, as it is obvious that various changes might be made to accomplish the functions secured without departing from the spirit of my invention.

Having thus set forth my invention, what I claim as new, and desire to secure by Letters Patent of the United States, is—

1. The combination, in a fare register and recorder, with the face or visible dial and the index-hand or pointer, a permanent recorder located within the outer casing of the instrument, consisting of a dial and a device for marking said dial, and a direction-indicator plate, of a main operating-shaft and means for connecting the same with the said index-hand, the marking device, and the direction-indicator plate, in a manner whereby the index-hand and the direction-indicator may be reset and the end of the trip be recorded upon said inner dial simultaneously at one operation of said main operating-shaft, substantially as described, and for the purpose set forth.

2. The combination, in a fare register and recorder, with the face or visible dial, the index-hand or pointer, and a shaft for carrying said index-hand, provided with an operating-wheel attached thereto, of a screw-threaded arm carried by said wheel, provided with a roll or wheel composed of one or more parts located thereon, forming a double-toothed periphery, one periphery being of greater circumference than the other and adapted to mark on a dial located within the outer casing of the instrument to record the fares and trips, respectively, and means for causing said marking device or wheel to press against the inner dial with different degrees of pressure to insure a single and a double mark thereon, as required, substantially as described, and for the purpose set forth.

3. The combination, in a fare register and recorder, with the outer or face dial and the index-hand or pointer, a shaft for carrying said index-hand, provided with an operating-wheel secured thereto, and means for operating said wheel, of a disk or dial located within the outer casing of the instrument, a screw-threaded arm carried by the said operating-wheel and provided with a device for marking said inner disk or dial, a main operating-shaft provided with a cam or eccentric thereon, and connecting mechanism operated by the latter to cause said marking device to press against the inner dial with an increased pressure, substantially as described, and for the purpose set forth.

4. The combination, in a fare-register, of the index-hand provided with the pin or projection $b^2$ on its under side, projecting through an opening in the dial-plate in position to be engaged by the index-hand-resetting mechanism, means for giving the index-hand its forward step-by-step movement, and means for resetting said index-hand to zero, consisting of a gear loosely mounted on a shaft or stud to rotate thereon, provided with the yielding projection or catch $e'$ for engaging said pin or projection $b^2$ on the index-hand, and an operating-shaft capable of rotation in one direction only, provided with a pinion having a fixed connection therewith adapted to engage with the said gear to move and reset the connecting index-hand, substantially as described, and for the purpose set forth.

5. The combination, in a fare register and recorder, with a direction-indicator plate centrally pivoted in the rear of and adjacent to the face or dial plate in position to be inspected through an opening in the latter and a trip hand or pointer, of mechanism for resetting said indicator-plate and trip hand or pointer simultaneously, consisting of a pivoted plate or disk provided with an arm for engaging said indicator-plate and with means for operating said trip hand or pointer, and means for rotating or operating said pivoted plate or disk, substantially as described, and for the purpose set forth.

6. The combination, in a fare-register, of a direction-indicator plate pivotally supported in the rear of the face or dial plate in position to be inspected through an opening therein and provided with a series of projections, an operating-shaft provided with an arm or projection, and a second shaft or rod provided with an arm or projection, both of said shafts being adapted for operating the indicator-plate, substantially as described, and for the purpose set forth.

7. In a fare register and recorder, the combination, with the index-hand or pointer, its pivoted operating-lever $f^3$, and intermediate connecting mechanism, the arms $f^6$, secured to said lever $f^3$, provided with the hook or catch at or near one end thereof, and the pivoted cam-lever $f^5$ for operating said lever $f^3$, of an alarm mechanism consisting of a bell and a pivoted bell-hammer adapted to be operated by the arm $f^6$, carried by the said operating-lever on the return stroke of the latter after moving the index-hand, the rebound of the bell-hammer being secured by a spring acting on the same, substantially as described, and for the purpose set forth.

8. The combination, in a fare register and recorder, with the index-hand or pointer, the means for giving the same its forward step-by-step movement, and the means for resetting the same to zero, consisting of an operating shaft and gear and an intermediate gear operated by the latter, having a catch for engaging the index-hand, of a centrally-pivoted direction-indicator plate provided with a series of peripheral sections, which are adapted to be engaged by an arm of the gear on said operating-shaft to lock the latter from movement when the index-hand has been reset to zero, and means for moving said direction-indicator to allow movement of the engaging-arm, substantially as described, and for the purpose set forth.

9. The combination, in a fare register and recorder, with the index-hand or pointer and its resetting mechanism, the latter consisting of a toothed wheel or disk provided with a catch for engaging the index-hand when operated and with a projecting arm and an operating shaft and gear for operating said toothed wheel or disk, of a centrally-pivoted direction-indicator plate provided with peripheral sections adapted when the plate is in a normal position to engage the arm of said toothed wheel or disk to lock the resetting mechanism from undue movement, and a device for giving the direction-indicator a preliminary move to free the said engaging-arm and allow movement of the resetting mechanism and be reset thereby, substantially as described, and for the purpose set forth.

10. The combination, in a fare-register, with the index-hand and its resetting mechanism, the latter consisting of a disk or wheel provided with means for engaging the index-hand and with an arm or projection and a shaft for operating said disk or wheel, of a centrally-pivoted direction-indicator plate provided with peripheral sections adapted when the plate is in a normal position to engage the arm or projection of said disk or wheel to lock the resetting mechanism from undue movement, and a spring-actuated rod or shaft provided with a catch for engaging the direction-indicator to give the same a preliminary move and allow movement of the resetting mechanism, substantially as described, and for the purpose set forth.

11. The combination, in a fare-register, with the index-hand, means for giving the same its forward step-by-step movement, and means for resetting the same to zero, consisting of an operating-shaft and pinion and a disk or gear operated by the latter, of a centrally-pivoted direction-indicator plate adapted to engage at its outer periphery with an arm carried by said disk or gear to lock the connecting operating-shaft from movement, substantially as described, and for the purpose set forth.

CHARLES CROOK.

Witnesses:
WALTER S. BALDWIN,
ARTHUR L. BALDWIN.